United States Patent [19]

Bartylla

[11] Patent Number: 5,017,052

[45] Date of Patent: May 21, 1991

[54] CUP CONVEYOR

[76] Inventor: James G. Bartylla, 16495 Rustling Oak Ct., Morgan Hill, Calif. 95037

[21] Appl. No.: 394,195

[22] Filed: Aug. 15, 1989

Related U.S. Application Data

[63] Continuation-in-part of Ser. No. 231,903, Aug. 15, 1988, abandoned, which is a continuation of Ser. No. 881,068, Jul. 2, 1986, abandoned.

[51] Int. Cl.[5] .................. B65G 51/03; B65G 51/02
[52] U.S. Cl. ........................................ 406/88; 406/86
[58] Field of Search ................................. 406/86–89

[56] References Cited

U.S. PATENT DOCUMENTS

| | | | |
|---|---|---|---|
| 4,500,229 | 2/1985 | Cole et al. | 406/88 |
| 4,710,068 | 12/1987 | Lindstrom et al. | 406/88 |
| 4,741,196 | 5/1988 | Stewart et al. | 406/88 X |

Primary Examiner—Margaret A. Focarino
Assistant Examiner—James M. Kannofsky
Attorney, Agent, or Firm—Malcolm B. Wittenberg

[57] ABSTRACT

A device for conveying cup-shaped objects, such as the bodies of two piece cans located between the bed of a mechanical press and a lower die shoe. A plenum is provided with a perforated upper deck surface for directionally expelling air which, together with an exhaust duct located upstream of the perforated upper deck surface, act to move the cup-shaped objects to a down-stream location for further processing.

5 Claims, 2 Drawing Sheets

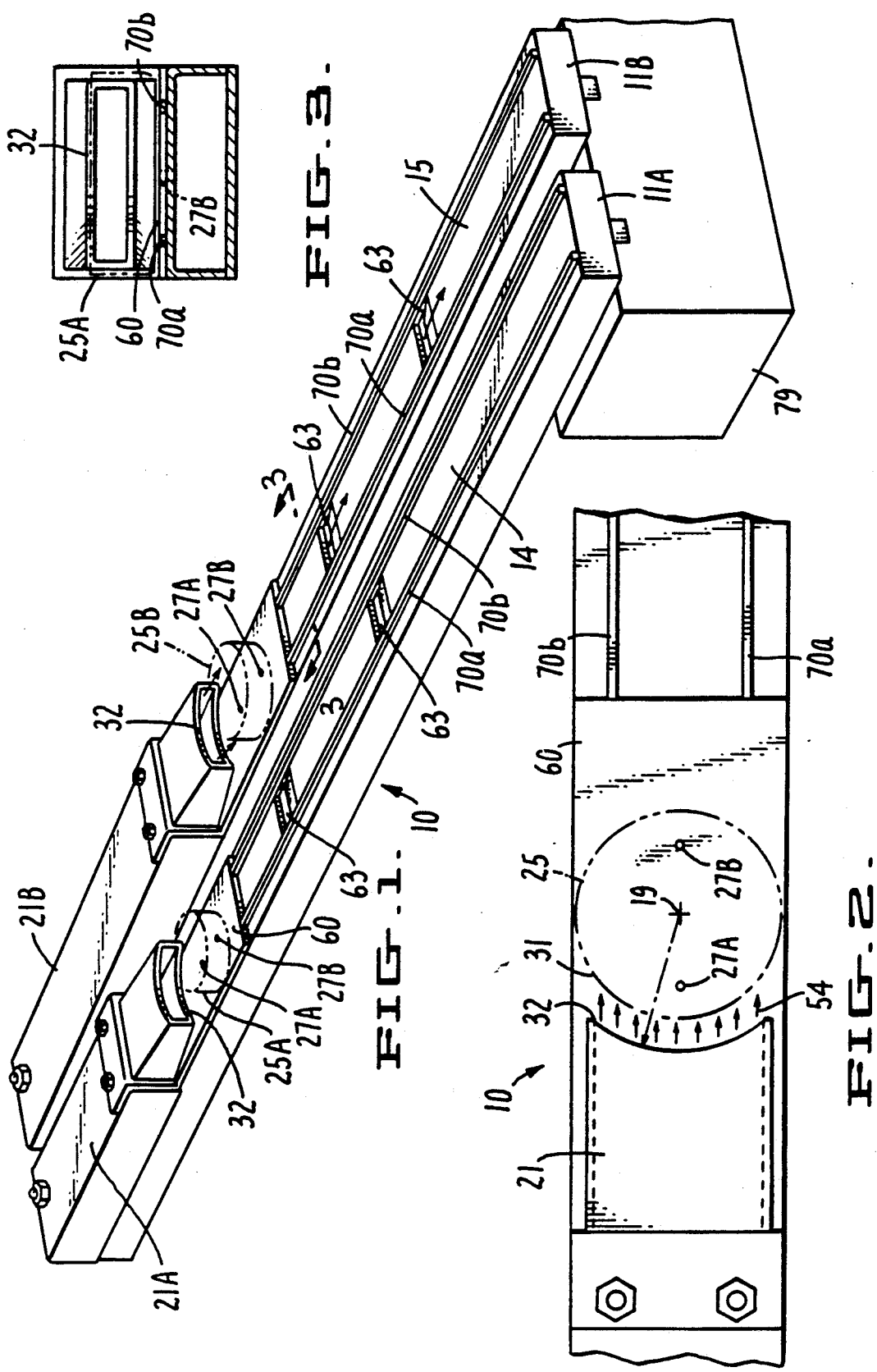

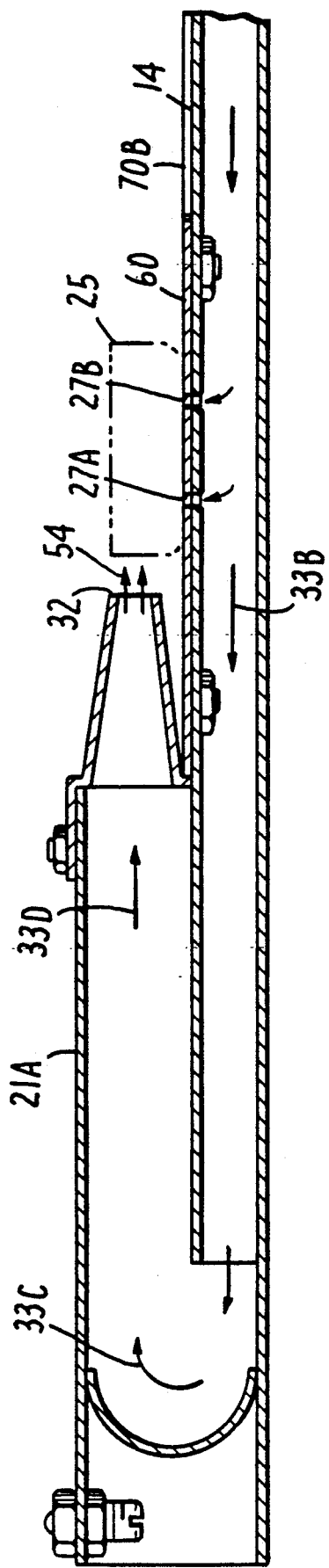
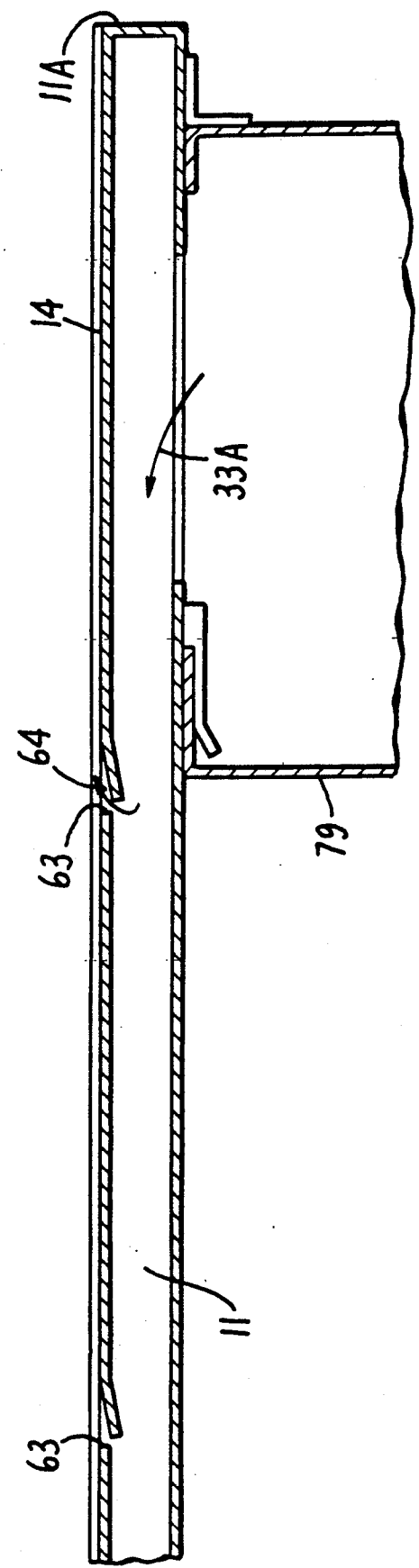

CUP CONVEYOR

RELATED APPLICATIONS

The present application is a continuation-in-part of U.S. patent application Ser. No. 231,903, filed on Aug. 15, 1988 which is in turn a continuation of U.S. patent application Ser. No. 881,068 filed on July 2, 1986. Both parent applications have been abandoned.

TECHNICAL FIELD OF THE INVENTION

The device of the present invention is a transferring apparatus which accepts cup-shaped objects, such as the bodies of two piece cans, from a stamping die which forms such objects from a coil or roll of very thin gauge sheet material. The device is capable of conveying such objects without the use of mechanically-driven belts or moving parts.

BACKGROUND OF THE INVENTION

Two piece beverage cans are becoming more popular and have virtually replaced the three piece can for a number of reasons. Two piece cans do not require soldered side seams and are thus more sanitary for use with food products. They are more appealing aesthetically and are less likely to leak. Beer and beverage cans of the so-called two piece type are currently being produced by the drawn and ironed method. As such, the first operation performed to produce such cans is through the use of a cupping press and a series of conveyors to feed the cups into multiple redraw presses commonly known as wall ironers or body-makers.

Two piece cans are generally blanked and drawn from coil or strip stock and are subsequently redrawn one or more times in order to build the sidewall of the can to a height which can accommodate typically twelve ounces of a beverage. Metal discs are blanked from the coil or strip stock and are punched to produce short cups which then must be conveyed out of the die to a downstream conveyor system which delivers the cups to the redraw presses. These cups leave the stamping dies at great speeds and their light weight and shape make the cups somewhat unstable and difficult to work with.

Prior art conveying devices used for receiving first punched cups for transport out of the die consisted of rubberized mechanical endless belts positioned between the bed of a mechanical press and a lower die shoe. As the cups dropped into position, the conveying belt would move the cups downstream and out of the die to the conveyor system which delivers the cups to the redrawing operation which reduces the diameter of the cup and increases the cup's sidewall height.

Although endless mechanical belts have been used for quite some time and are generally viewed as being reliable in the acceptance and transference of cups from the punch press, it was quite common to experience breakdown in the operation of the mechanical belt. This device was called upon to operate at high speed in a continuous mode, for the normal operation of a can fabricating and handling plant requires an endless supply of cup precursors. If the endless belt or its drive members failed, the consequences could be catastrophic for the entire operation of the plant. Such breakdown would require a termination of the stamping die and punch press, which would terminate the flow of cup stock to the downstream operations of the plant. This could literally result in a plant shutdown, which would last until the conveying device was repaired or replaced.

The use of an air conveyor in a space defined between the bed of a mechanical press and a lower die shoe mounted on the press for removing a succession of cup-shaped objects has been taught in U.S. Pat. No. 4,741,196. Although the invention disclosed and claimed in the referenced patent represented an advance over endless mechanical belts, further improvements to the disclosed air conveyor were envisioned as being desirable. For example, often times, cups dropping onto the conveyor surface are coated with a thin layer of oil as a result of the sheet stock moving through the mechanical press assembly. This oil can result in thin film adhesion between the cup and upper surface of the air conveyor or plenum. In addition, the nozzle for expelling compressed air parallel to the conveyor surface was taught in U.S. Pat. No. 4,741,196 to be a simple louvered outlet which was found to be inefficient in moving the cup-shaped objects in a downstream direction along the plenum.

It is thus an object of the present invention to provide a device for conveying cup-shaped objects, such as the bodies of two piece cans, without the use of any moving parts.

It is yet another object of the present invention to provide a device for conveying cup-shaped objects, such as the bodies of two piece cans, through the use of directionally applied pressurized air without experiencing instability or part turbulence throughout the length of operation of the conveying device.

These and further objects will be more readily perceived when considering the following disclosure and appended drawings wherein:

FIG. 1 illustrates the deck used for receiving and transporting cup-shaped objects according to the present invention.

FIG. 2 is an overhead plan view of the cup-receiving zone of the present invention.

FIG. 3 is a cross-sectional view taken along section line 3—3 of FIG. 2.

FIGS. 4A and 4B are cross-sectional views of the plenum of the present invention.

SUMMARY OF THE INVENTION

The present invention broadly deals with a device for conveying cup-shaped objects which is adapted for use in a space defined between the bed of a mechanical press and a lower die shoe mounted on the press. The device comprises means for establishing a pressurized source of air and means for feeding the pressurized air to a plenum. The plenum is characterized as having an upper deck surface having a cup-shaped object receiving zone where the objects are successively deposited. One or more holes are located within the upper deck surface at the receiving zone for the discharge of air from the plenum. An upstream exhaust duct is positioned to direct a flow of air longitudinally above the upper deck surface which is used for moving the cup-shaped objects thereon. The air discharge port is of a concave configuration and circular in shape wherein its circular curvature is radially equidistant from a center point defined by a geometric center established at the point at which the cup-shaped objects are received upon the receiving zone.

DETAILED DESCRIPTION OF THE INVENTION

Turning first to FIG. 1, element 10 depicts virtually the entire invention with the exception of means such as the centrifugal fan which supplies pressurized air via duct 79 into the plenum structure. In addition, conventional prior elements such as the bed of a mechanical press and the lower die shoe mounted on the press providing the environment for the location of the present device are not shown. However, such a configuration is depicted in U.S. Pat. No. 4,741,196, the disclosure of which is herein incorporated by reference. The incoming pressurized air moves through bottom plenum section 79 and into upper plenum sections 11A and 11B, etc. via a serpentine route as shown by arrows 33A, B, C, and D (FIGS. 4A and 4B).

Upper plenum shown in FIG. 1 as individual track portions 11A and 11B are provided with upper deck surfaces 14 and 15 which are staggered with respect to each other, for the stamping die (not shown) mounted in a typical punch press (not shown), which are in general commercial operation, cut circular blanks of sheet stock in pairs for each stroke of the punch press and the cups drop generally in pairs in a staggered fashion. These pairs of cut stock are drawn through a forming die to create the cup configuration and adhere to the punch by friction. The formed cups are stripped from the punch by use of a combination of a short blast of compressed air through the punch which, when applied with a mechanical stripper, pushes the formed cup off the punch.

As cups 25A and 25B drop from the punch, they generally travel at a high rate of speed, landing on upper plenum surfaces 14 and 15 at high velocity. It was thus incumbent in fabricating the present invention to provide a device which would accept cup-shaped objects in this fashion and move them along in a pre-described direction without creating lift or tumble to the cups as they strike the upper plenum surface and are pushed along by the pressurized air source. It was further deemed necessary to provide means for dealing with the fact that cups 25A and 25B generally are characterized as having a thin oily film on their surfaces as a result of the sheet stock moving through the mechanical press assembly. This oil can result in thin film adhesion between the cup and upper surface of the air conveyor or plenum.

The present invention achieves its goals by providing the combination of an exhaust duct of specific configuration and upper plenum surface which directionally expels pressurized air in the direction of travel of the cup-shaped objects and which is provided with regions of restriction for the passage of the pressurized air in the area where the cup-shaped objects are accepted from the punch. This receiving zone is best seen by viewing FIG. 2 whereby cup-shaped object 25 is shown residing upon the upper deck surface at receiving zone 60.

It was found that enhanced results could be achieved if upstream exhaust duct 21 was provided with discharge port 32 of a specific geometrical configuration. More specifically, cup-shaped object 25, being substantially circular in its planar dimension is provided with a center point 19. The center point falls substantially at the same point upon receiving zone 60 as successive cups drop from the press. It was found that enhanced cup movement from receiving zone 60 downstream along the plenum could be enhanced if upstream exhaust ducts 21A/21B, etc., would be provided with an air discharge port 32 being concave and circular in shape wherein its circular curvature is radially equidistant from center point 19. As such, the radial curvature of discharge port 32 is substantially the same as the curvature of circumference 31 of cup-shaped object 25. As a consequence, all of the air flowing from discharge port 32 as depicted by arrows 54 impact upon cup-shaped object 25 uniformly across the circumference of cup-shaped object 25. This provides for a far superior movement of the cup-shaped object without tumble than has been achievable by prior art devices.

As previously noted, often times, cups dropping onto receiving zone 60 are coated with a thin layer of oil as a result of the sheet stock moving through the mechanical press assembly. This oil can result in a thin film adhesion between the cup and upper surface of the air conveyor or plenum. In order to break this adhesion, the present invention contemplates employing holes 27A and 27B (FIG. 2) within receiving zone 60. Ideally, these openings are not louvered but simply expel air in a direction perpendicular to the upper deck surface at receiving zone 60.

After departing receiving zone 60, as a result of pressure being exerted upon cup 25 by the air emanating from upstream exhaust duct 21, the cups proceed along surfaces of plenums 14 and 15 by residing upon ribs 70A and 70B (FIG. 3). By residing upon these ribs, frictional drag which may otherwise inhibit cup movement is reduced by reducing the surface area of contact between the cups and the plenum surfaces.

To further enhance cup movement after cups leave receiving zone 60, louvered slots 63 are positioned periodically upon surfaces 14 and 15 to directionally discharge air as shown by arrow 64.

There are obviously a number of variables which affect the rate in which cup-shaped objects can be transported by employing the device of the present invention. These various processing conditions include such things as air pressure, cup dimension and weight. For example, a steel cup will weight more than an aluminum cup of the same physical dimension. As such, air flow through exhaust ducts 32 and 63 will generally be increased when using the present invention for transporting steel cups than for their aluminum counterparts.

By practicing the above-recited invention, one is able to employ pressurized air as a conveyance medium to remove cup-shaped objects from their drop point and region of their creation to a second downstream location while avoiding the problems of lift and tumble, which have plagued prior art devices. When the cup-shaped objects tumble, they catch on the discharge hole through which the cup-shaped objects pass when exiting the die and punch. As a result of catching on the hole, the eject travel of the cup-shaped objects away from the punch-drop zone is momentarily hindered, thereby causing a delay of cup travel.

As will be appreciated from reviewing the above-recited description of the present invention, the receiving zone employed with restricted air passages 27A and 27B when employed in combination with exhaust duct 32 causes the cup-shaped objects to be retained onto the upper deck surface and smoothly transported downstream to a second location. What is created is the combination of venturi and Bernoulli effects, which cause cup-shaped objects to be entrained onto the air stream without tumbling. The conveyance is carried out by a combination of the air cushion emanating directionally from the upper deck surfaces 14 and 15 and from exhaust duct 32. This combination is capable of carrying out the conveyance of cup-shaped objects which have been air-stripped from a die punch, which are thus caused to strike the plenum's upper deck surface at reasonably high velocities.

The air pressures employed in using the device of the present invention can be supplied by any commercially available centrifugal fan driven by an electrical motor or other means. Typically, one should provide a motor between 0.5 to 1.0 horsepower to provide between 2 and 8 inches of pressure (water gauge).

The device of the present invention is ideally suited to accept up to 250 cup-shaped objects per minute per lane. In doing so, the air pressures of from 0.5 to 3 inches (water gauge) should emanate from duct 32.

It is suggested in practicing the present invention with cup-shaped objects intended to be configured into 12 ounce aluminum cans that the device employ between 50 and 200 cubic feet per minute of pressurized air with approximately 10 to 60 cubic feet per minute of said air emanating from exhaust duct orifice 32. The remainder of the air is either vented or caused to pass through upper deck surfaces 14 and 15 at louvered opening 63 as well as through holes 27A and 27B located within receiving zone 60.

It will be clear that numerous modifications may be made without departing from the spirit of the invention, and no limitation non-specifically claimed is intended and none should be implied. For example, although two zones 14 and 15 are shown as constituting individual plenums, additional plenums can be employed while remaining within the spirit and scope of this invention.

What is claimed is:

1. A device for conveying cup-shaped objects adapted for use in a space defined between the bed of a mechanical press and a lower die shoe mounted on the press which forms said cup shaped objects, said device comprising means for establishing a pressurized source of air and means for feeding the pressurized air to a plenum wherein said plenum is characterized as having an upper deck surface having a cup-shaped object receiving zone where said objects are successively deposited, one or more holes located within said upper deck surface at said receiving zone for the discharge of air from said plenum and an upstream exhaust duct positioned to direct a flow of air longitudinally above said upper deck surface for moving said cup-shaped objects longitudinally along said upper deck surface, said upstream exhaust duct having an air discharge port being concave and circular in shape wherein its circular curvature is radially equidistant from a center point defined by a geometric center established at the point at which said cup-shaped objects are received upon said receiving zone.

2. The device of claim 1 wherein the upper deck surface of said plenum is segregated into two or more zones, each of which is capable of simultaneously accepting and transporting cup-shaped objects.

3. The device of claim 1 wherein said holes located within said upper deck surface at said receiving zone expel air from within the plenum in a direction perpendicular to said upper deck surface.

4. The device of claim 1 wherein said upper deck surface is further provided with louvered openings located downstream of the cup-shaped object receiving zone to expel air from within the plenum to move said cup-shaped objects down said upper deck surface.

5. The device of claim 1 wherein a pair of parallel ribs are positioned atop the upper deck surface of each plenum extending over the entire length of each upper deck surface except for that portion occupied by said receiving zone.

* * * * *